US012748386B2

(12) United States Patent
Lamba et al.

(10) Patent No.: US 12,748,386 B2
(45) Date of Patent: Sep. 29, 2026

(54) METHOD AND ELECTRONIC DEVICE FOR GENERATING THEME FOR COUPLED DEVICES

(71) Applicant: SAMSUNG ELECTRONICS CO., LTD., Suwon-si (KR)

(72) Inventors: Prabhat Lamba, Bangalore (IN); Mohamed Akram Ulla Shariff, Bangalore (IN); Parameswaranath Vadackupurath Mani, Bangalore (IN); Barath Raj Kandur Raja, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/280,903

(22) Filed: Jul. 25, 2025

(65) Prior Publication Data

US 2026/0227746 A1 Aug. 6, 2026

Related U.S. Application Data

(63) Continuation of application No. PCT/KR2025/008805, filed on Jun. 24, 2025.

(30) Foreign Application Priority Data

Feb. 4, 2025 (IN) ............................ 202541009274

(51) Int. Cl.
*H04M 1/72427* (2021.01)
*G04G 9/00* (2006.01)

(52) U.S. Cl.
CPC ...... *G04G 9/0064* (2013.01); *H04M 1/72427* (2021.01)

(58) Field of Classification Search
CPC ......................... G04G 9/0064; H04M 1/72427
See application file for complete search history.

(56) References Cited

U.S. PATENT DOCUMENTS 6,557,017 B1 4/2003 Venable
2007/0185866 A1 8/2007 Evans
(Continued)

FOREIGN PATENT DOCUMENTS

CN 116795501 A 9/2023
CN 117555450 A 2/2024

OTHER PUBLICATIONS

International Search Report (PCT/ISA/210) and Written Opinion (PCT/ISA/237) issued by the International Searching Authority on Oct. 30, 2025 in corresponding International Application No. PCT/KR2025/008805.
(Continued)

*Primary Examiner* — Lisa S Landis
(74) *Attorney, Agent, or Firm* — Sughrue Mion, PLLC

(57) ABSTRACT

A method may include receiving, from a first device, multimedia data related to a theme applied on the first device, determining, using an artificial intelligence (AI) model, one or more theme attributes based on the multimedia data, and obtaining one or more editable features associated with a display of a second device. The method may include obtaining a plurality of theme elements for each combination of a theme attribute from among the one or more theme attributes and an editable feature from among the one or more editable features, obtaining a plurality of themes based on the plurality of theme elements, and determining, as the theme to be generated for the second device, a theme with a maximum cardinality score from among the plurality of themes. The
(Continued)

second device may be coupled with the first device. Each of the plurality of themes may include a corresponding cardinality score.

20 Claims, 6 Drawing Sheets

(56) References Cited

U.S. PATENT DOCUMENTS

| | | | | |
|---|---|---|---|---|
| 2017/0099602 | A1* | 4/2017 | Joo | G06F 21/32 |
| 2018/0101352 | A1 | 4/2018 | Choi | |
| 2023/0376547 | A1* | 11/2023 | Stewart | G06F 16/953 |

OTHER PUBLICATIONS

"R/SamsungThemes", reddit, May 16, 2018, 37 pages, https://www.reddit.com/r/SamsungThemes/s/UH3w2LzKOk.

Rajesh Pandey, "Pixel Watch's new app drawer and dynamic themes look like", Android Police, Feb. 7, 2024, 1 page, https://www.androidpolice.com/pixel-watch-new-app-drawer-dynamic-themeslook-like/.

* cited by examiner

METHOD AND ELECTRONIC DEVICE FOR GENERATING THEME FOR COUPLED DEVICES

CROSS-REFERENCE TO RELATED APPLICATIONS

This application is a continuation application of International Application No. PCT/KR2025/008805, filed on Jun. 24, 2025, which claims priority to Indian Patent Application number 202541009274, filed on Feb. 4, 2025, in the Indian Patent Office, the disclosures of which are incorporated by reference herein in their entireties.

BACKGROUND

1. Field

The present disclosure relates generally to visual graphics of a user device, and more particularly, to a method of generating a theme for coupled devices and a device thereof.

2. Description of Related Art

A theme may refer to a set of styles and/or attributes such as, but not limited to, color, design, audio, shape, or font which may affect the look, feel, and/or in-application experience of a user device. Themes may have consistent design patterns that may contribute to a sense of familiarity. Therefore, themes may help users to navigate and/or understand a user interface more efficiently.

Typically, a user may use the same themes for all devices associated with that user, so that the user may navigate and/or understand the user interface of the respective devices more efficiently. However, to customize the theme for each of the user devices, the user may use different applications and/or may manually generate themes for every device associated with that user. In some cases, the themes may not be available for a particular device. For example, the themes that may be available for a smartphone may not be available for a smartwatch. In such an example, the user either may have to manually generate the theme and/or may have to apply a theme similar to the desired theme. However, manually generating the themes may take a relatively long period of time, and hence, may not be efficient. Alternatively or additionally, customizing a theme for other user devices may be relatively complex, in particular, if user devices have different operating systems (OS).

The information disclosed in this background of the disclosure section may be provided for enhancement of an understanding of a general background of the present disclosure and may not be taken as an acknowledgement or any form of suggestion that the information forms a related art already known to a person skilled in the art.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present disclosure in a simplified form as a prelude to the more detailed description that is presented later.

According to an aspect of the present disclosure, a method performed by an electronic device may be provided. The method may include receiving, from a first device, multimedia data related to a theme applied on the first device. The method may include determining, using an artificial intelligence (AI) model, one or more theme attributes based on the multimedia data. The method may include obtaining one or more editable features associated with a display of a second device. The method may include obtaining a plurality of theme elements for each combination of a theme attribute from among the one or more theme attributes and an editable feature from among the one or more editable features. The method may include obtaining a plurality of themes based on the one or more theme elements, using the AI model. The method may include determining, as the theme to be generated for the second device, a theme with a maximum cardinality score from among the plurality of themes. The second device may be coupled with the first device. Each theme of the plurality of themes may comprise a corresponding cardinality score.

According to an aspect of the present disclosure, an electronic device may be provided. The electronic device may comprise one or more processors including processing circuitry, and memory storing at least one instruction. The at least one instruction, when executed by the one or more processors individually or collectively, may cause the electronic device to receive, from a first device, multimedia data related to a theme applied on the first device. The at least one instruction, when executed by the one or more processors individually or collectively, may cause the electronic device to determine, using an AI model, a one or more theme attributes based on the multimedia data. The at least one instruction, when executed by the one or more processors individually or collectively, may cause the electronic device to obtain one or more editable features associated with a display of a second device. The at least one instruction, when executed by the one or more processors individually or collectively, may cause the electronic device to obtain a plurality of theme elements for each combination of a theme attribute from among the one or more theme attributes and an editable feature from among the one or more editable features. The at least one instruction, when executed by the one or more processors individually or collectively, may cause the electronic device to obtain a plurality of themes based on the plurality of theme elements, using the AI model. The at least one instruction, when executed by the one or more processors individually or collectively, may cause the electronic device to determine, as the theme to be generated for the second device, a theme with a maximum cardinality score from among the plurality of themes. The second device may be coupled with the first device. Each theme of the plurality of themes may comprise a corresponding cardinality score.

According to an aspect of the present disclosure, a non-transitory computer-readable storage medium may store at least one computer-executable instruction. The at least one computer-executable instruction, when executed by at least one processor of an electronic device individually or collectively, may cause the electronic device to receive, from a first device, multimedia data related to a theme applied on the first device. The at least one computer-executable instruction, when executed by at least one processor of an electronic device individually or collectively, may cause the electronic device to determine, using an AI model, one or more theme attributes based on the multimedia data. The at least one computer-executable instruction, when executed by at least one processor of an electronic device individually or collectively, may cause the electronic device to obtain one or more editable features associated with a display of a second device. The at least one computer-executable instruction, when executed by at least one processor of an electronic device individually or collectively, may cause the electronic device to obtain a plurality of theme elements for each combination of a theme attribute from among the one or more theme attributes and an editable feature from among the one or more editable features. The at least one computer-executable instruction, when executed by at least one processor of an electronic device individually or collectively, may cause the electronic device to obtain a plurality of themes based on the plurality of theme elements, using the AI model. The at least one computer-executable instruction, when executed by at least one processor of an electronic device individually or collectively, may cause the electronic device to determine as the theme to be generated for the second device, a theme with a maximum cardinality score from among the plurality of themes. The second device may be coupled with the first device. Each theme of the plurality of themes may include a corresponding cardinality score.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of an embodiment of the present disclosure may be more apparent from the following description taken in conjunction with the accompanying drawings, in which.

DETAILED DESCRIPTION

Figure 1:
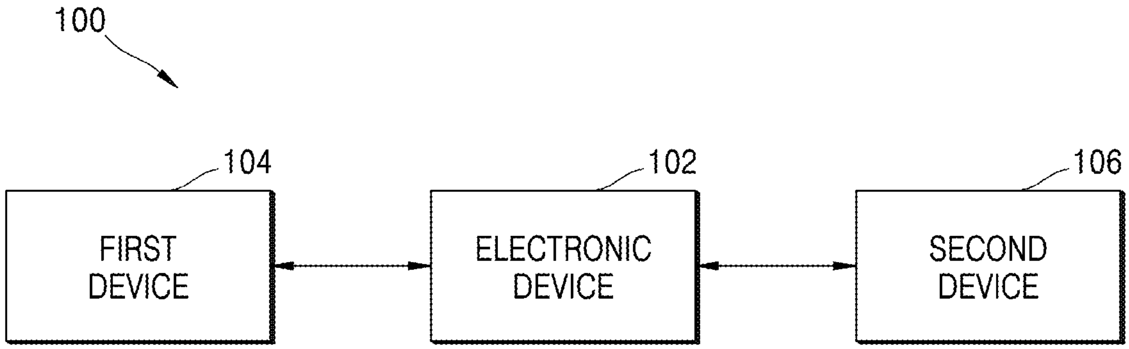
FIG. 1 illustrates an exemplary environment, in accordance with an embodiment.

The following description with reference to the accompanying drawings is provided to assist in a comprehensive understanding of an embodiment of the present disclosure defined by the claims and their equivalents. Various specific details are included to assist in understanding, but these details are considered to be exemplary only. Therefore, those of ordinary skill in the art may recognize that various changes and modifications of the embodiment described herein may be made without departing from the scope and spirit of the disclosure. In addition, descriptions of well-known functions and structures are omitted for clarity and conciseness.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, an embodiment thereof has been shown by way of example in the drawings and are described below. It is to be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or operations may not include only those components or operations but may include other components or operations not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure may provide methods and systems for generating a theme for coupled devices. The present disclosure may obtain multimedia data from a first device and may generate a theme for a second device, based on the multimedia data. Particularly, an artificial intelligence (AI) model may facilitate the determination of a theme for coupled devices.

In the following description of an embodiment of the disclosure, reference may be made to the accompanying drawings that form a part hereof, and in which are shown by way of illustration embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

It should be appreciated by those skilled in the art that any block diagram herein represents conceptual views of illustrative systems embodying the principles of the present subject matter. Similarly, it is to be appreciated that any flow charts, flow diagrams, state transition diagrams, pseudo code, or the like represent various processes which may be substantially represented in computer readable medium and executed by a computer or processor, whether or not such computer or processor is explicitly shown.

Any of the functions or operations described herein may be processed by one processor or a combination of processors. The one processor or the combination of processors may be circuitry performing processing and may include circuitry like an application processor (AP), a communication processor (CP), a graphical processing unit (GPU), a neural processing unit (NPU), a microprocessor unit (MPU), a system on chip (SoC), an IC, or the like.

A function related to AI according to the disclosure is implemented through a processor and a memory. The processor may be configured as one or more processors. In this case, the one or more processors may be a general-purpose processor such as a central processing unit (CPU), an application processor (AP), or a digital signal processor (DSP), a dedicated graphics processor such as a graphics processing unit (GPU) or a vision processing unit (VPU), or a dedicated AI processor such as a neural processing unit (NPU). The one or more processors may control input data to be processed according to predefined operation rules or an AI model stored in a memory. Alternatively, when the one or more processors are AI-dedicated processors, they may be designed with a hardware architecture specialized for processing specific AI models.

The predefined operation rules or AI model may be generated via training. When the predefined operation rules or AI model are generated via training, it means that the predefined operation rules or AI model set to perform desired characteristics (or purposes) is generated by training a basic AI model with a learning algorithm that utilizes a large number of training data. The training may be performed by a device itself (e.g., the cleaner body 1000) where AI according to the disclosure is being performed, or performed through a separate server and/or system. Examples of the learning algorithm include, but are not limited to, supervised learning, unsupervised learning, semi-supervised learning, and reinforcement learning.

An AI model may include a plurality of neural network layers. Each of the neural network layers includes a plurality of weight values, and performs a neural network arithmetic operation via an arithmetic operation between an arithmetic operation result of a previous layer and the plurality of weight values. A plurality of weight values in each of the neural network layers may be optimized by a result of training the AI model. For example, the plurality of weight values may be refined to reduce or optimize a loss value or a cost value obtained by the AI model during the training. An artificial neural network may include, for example, but is not limited to, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as, but not limited to, device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, or the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, embodiments of the present disclosure are described with reference to FIGS. 1 to 6.

FIG. 1 may illustrate an exemplary environment 100 in which an embodiment of the present disclosure may be practiced. The exemplary environment 100 may include an electronic device 102, a first device 104, and a second device 106. Examples of the first device 104 and the second device 106 may include, but not be limited to, a smartphone, a smartwatch, a laptop, a tablet, a television, or the like. The electronic device 102, the first device 104 and the second device 106 may be implemented on multiple platforms and/or operating systems (OS).

In an embodiment, both the first device 104 and the second device 106 may be associated with a user. In an embodiment, the first device 104 and the second device 106 may be coupled devices (e.g., connected via wireless communication and/or wired communication). The first device 104 and the second device 106 may be in an operative communication with the electronic device 102. The first device 104 may send multimedia data to the electronic device 102. The multimedia data may be related to a theme applied on the first device 104. The multimedia data may include, but may not be limited to, an image, an audio file, a video file, or a theme associated with the first device 104. The electronic device 102, on receiving the multimedia data, may generate a theme that may be applied on the second device 106. For example, the multimedia data may include a snowy theme applied on the first device 104. The electronic device 102 based on the snowy theme of the first device 104, may determine a snowy theme that may be compatible for being applied on the second device 106. In an embodiment, the determination of how a theme may be generated for a particular device may depend on the type of the device. For example, aesthetic features of the snowy theme may depend on whether said theme is to be applied on a smartphone or a smartwatch.

In an embodiment, the first device 104 and the second device 106 may be in operative communication with the electronic device 102, via the Internet, enabled by a network provider, which may be referred to as an internet service provider (ISP). The first device 104 and the second device 106 may be connected to the electronic device 102 using a wireless network. Some non-limiting examples of wireless networks may include the wireless local area network (WLAN), cellular networks, Bluetooth™, ZigBee networks, or the like.

An embodiment of the present disclosure may disclose a method performed by the electronic device 102 for generating a theme for coupled devices (e.g., the first device 104 and the second device 106). The electronic device 102 may obtain multimedia data from the first device 104 to generate a theme for the second device 106. The operations performed by the electronic device 102 may be described with reference to FIG. 2.

Figure 2:
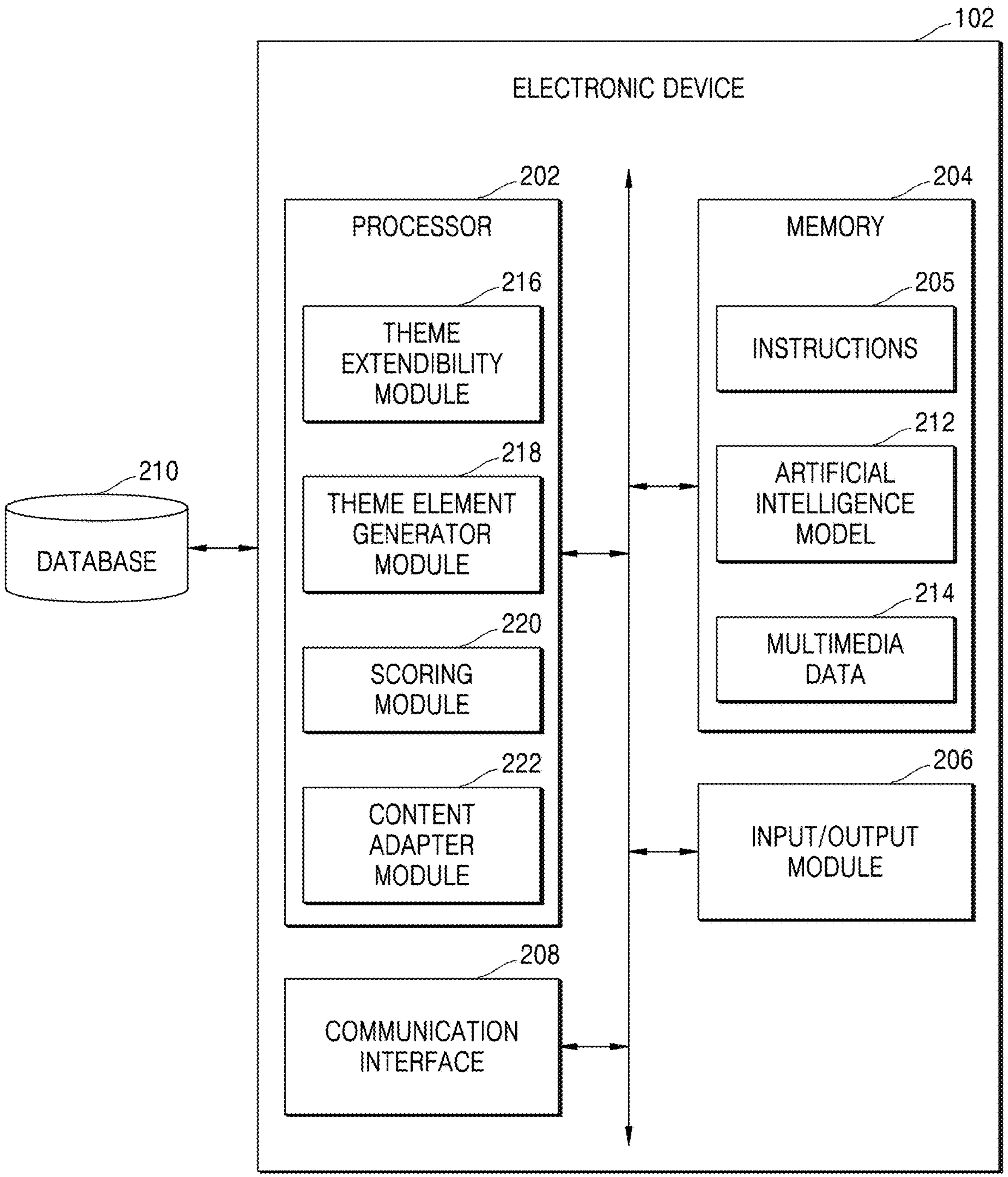
FIG. 2 illustrates a block diagram of an electronic device for generating a theme for coupled devices, in accordance with an embodiment.

FIG. 2 may illustrate an electronic device 102 for generating a theme for coupled (e.g. connected) devices, in accordance with an embodiment of the present disclosure. In an embodiment, the electronic device 102 may establish a connection with the first device 104 for generating the theme for the second device 106.

In an embodiment, the electronic device 102 may be deployed at a different location and the first device 104 and the second device 106 may access the electronic device 102, in a case of which the theme is to be generated. In an embodiment, the electronic device 102 may be deployed within the first device 104 and/or the second device 106. In an embodiment, the first device 104 and the second device 106 may be operatively coupled to the electronic device 102, or the like. In an embodiment, the electronic device 102 may receive multimedia data 214 as input, in a case of which a first theme (e.g., a theme customized for the first device 104) is applied on the first device 104. The multimedia data 214 may include, but is not limited to, visual features, audio features, textual data present in the multimedia data 214. In an embodiment, the electronic device 102 may be connected to the first device 104 and the second device 106 using a wired network, a wireless network, or a combination of wired and wireless networks. Some non-limiting examples of the wired networks may include, the Ethernet, a local area network (LAN), a fiber-optic network, or the like. Some non-limiting examples of the wireless networks may include a WLAN, cellular networks, Bluetooth™, ZigBee networks, or the like.

The electronic device 102 may include a processor 202, a memory 204, an input/output (I/O) module 206, and a communication interface 208. In an embodiment, the electronic device 102 may include more or fewer components than those depicted herein. The various components of the electronic device 102 may be implemented using hardware, software, firmware, or any combinations thereof. Further, the various components of the electronic device 102 may be operably coupled with each other. For example, various components of the electronic device 102 may be capable of communicating with each other using communication channel media (such as, but not limited to, buses, interconnects, or the like). The processor 202 may include at least one data processor for executing program components for executing user or system-generated requests. The memory 204 may be communicatively coupled to the processor 202. The memory 204 may store at least one instruction 205, executable by the processor 202. The at least one instruction 205, on execution, may cause the processor 202 to generate a theme for coupled devices (e.g., the first device 104 and the second device 106).

In an embodiment, the one or more processors included in the processor 202 may be circuitries such as a System on Chip (SoC) or an Integrated Circuit (IC). The one or more processors included in the processor 202 may include general-purpose processors such as a Central Processing Unit (CPU), a Microprocessor Unit (MPU), an Application Processor (AP), and a Digital Signal Processor (DSP); graphics-dedicated processors such as a Graphic Processing Unit (GPU) and a Vision Processing Unit (VPU); artificial intelligence-dedicated processors such as a Neural Processing Unit (NPU); or communication-dedicated processors such as a Communication Processor (CP). When the one or more processors included in the processor 202 are artificial intelligence-dedicated processors, such processors may be designed with a hardware architecture specialized for processing a specific artificial intelligence model. The one or more processor included in the processor 202 may be embodied as a multi-core processor, a single core processor, or a combination of one or more multi-core processors and one or more single core processors. In an embodiment, the processor 202 may include, but not limited to, a theme extendibility module 216, a theme element generator module 218, a scoring module 220, and a content adapter module 222.

The processor 202 may write data to the memory 204 or read data stored in the memory 204. The processor 202 may process data according to defined operation rules or an artificial intelligence model by executing a program or at least one instruction 205 stored in the memory 204. The processor 202 may perform the operations described in the embodiments below, and unless otherwise specified, the operations described as being performed by the electronic device 102 or its detailed components in the following embodiments may be understood as being performed by the processor 202. As used herein, the term AI model may refer to a model that may have been trained on a set of data to recognize certain patterns and/or make certain decisions without further human intervention. The AI model may apply different techniques to relevant data inputs to achieve tasks and/or output data according to training of the AI model. The AI model may be and/or may include a continuous learning model in an embodiment. An embodiment of the present disclosure may be described with regards to a trained model based on a retrieval-augmented generation (RAG) model, however, the present disclosure is not limited thereto. For example, the AI model 212 may be and/or may include various other models such as, but not limited to, a large language model (LLM), a large multimodal model, a large vision model, or the like may be used.

The theme extendibility module 216 may determine one or more theme attributes based on the multimedia data 214 obtained from the first device 104. The one or more theme attributes may be based on at least one of visual features, audio features, textual data, or the like that may be present in the multimedia data 214. The theme extendibility module 216 may be based on a RAG model. Generally, a RAG model may be implemented for enhancing the accuracy and reliability of generative AI models with data fetched from external sources (such as, but not limited to, different databases, open sources, digital libraries, or the like). In an embodiment, the RAG model may be used to determine the one or more theme attributes. The AI model 212 may be trained to access external sources based on the multimedia data 214 obtained from the first device 104. For example, considering the first device 104 to be a smartphone and the second device 106 to be a smartwatch, the multimedia data 214 may include a snowy theme on the smartphone. The one or more theme attributes that may be obtained from the snowy theme may include theme attributes such as, but not limited to, snowflakes, snowman, snowy mountains, and snowy font. In an embodiment, the theme extendibility module 216, which may be based on the RAG model, may determine the one or more theme attributes such as, but not limited to, a video of snowfall, icicles, an audio clip of snowfall, different snowy sceneries, or the like. The theme extendibility module 216 may determine the one or more theme attributes based on the commonly associated visual features, audio features, textual data, or the like that may be associated with snow.

The processor 202 may receive one or more editable features associated with a display of the second device 106. For example, considering the second device 106 to be a smartwatch, the one or more editable features received by the processor 202 may include, hour needle, minute needle, second needle, watch face, Applications (apps), watch background, clock numbers, or the like. The one or more editable features may be the features of the second device 106 that may be theme-able or changeable when applying a theme. For example, the one or more editable features may correspond to the features of the second device 106 that can be aesthetically modified in order to depict the desired theme.

The processor 202 in conjunction with the theme element generator module 218, on receiving the one or more editable features, may generate a plurality of theme elements. A theme element may be generated for each combination of a theme attribute from the one or more theme attributes and an editable feature from the one or more editable features. For example, considering the first device 104 to be a smartphone and the second device 106 to be a smartwatch, the multimedia data 214 may include a snowy theme on the smartphone. The one or more theme attributes may include, but not be limited to, snowflakes, snowman, snowy mountains, icicles, snowy font, or the like. The one or more editable features may include, but not be limited to, hour needle, minute needle, second needle, watch face, applications (apps), watch background, clock numbers, or the like. The plurality of theme elements (e.g., a combination of a theme attribute and an editable feature) may be numbered as shown in Table 1 (e.g., (1, 1), (1, 2), . . . , (9, 7)). Table 1 depicts each combination of a theme attribute from the one or more theme attributes and an editable feature from the one or more editable features.

TABLE 1

| Editable Features/ Theme Attributes | Watchface (Digital) | | | | Apps Tray | | Settings Screen | | |
|---|---|---|---|---|---|---|---|---|---|
| | | | | | | | | List | |
| | Time | Time Separator | Watch Face Background (BG) | Watch Face Element | Tray BG | Icon BG | Icons BG | Items BG | Screen BG |
| Snowy Mountain | (1, 1) | (2, 1) | (3, 1) | (4, 1) | (5, 1) | (6, 1) | (7, 1) | (8, 1) | (9, 1) |
| Icicle | (1, 2) | (2, 2) | (3, 2) | (4, 2) | (5, 2) | (6, 2) | (7, 2) | (8, 2) | (9, 2) |
| Snowflakes | (1, 3) | (2, 3) | (3, 3) | (4, 3) | (5,3) | (6, 3) | (7, 3) | (8, 3) | (9, 3) |
| Snow Fonts | (1, 4) | (2, 4) | (3, 4) | (4, 4) | (5, 4) | (6, 4) | (7, 4) | (8, 4) | (9, 4) |
| Device Fonts | (1, 5) | (2, 5) | (3, 5) | (4, 5) | (5, 5) | (6, 5) | (7, 5) | (8, 5) | (9, 5) |
| Clouds | (1, 6) | (2, 6) | (3, 6) | (4, 6) | (5, 6) | (6, 6) | (7, 6) | (8, 6) | (9, 6) |
| Snowfall | (1, 7) | (2, 7) | (3, 7) | (4, 7) | (5, 7) | (6, 7) | (7, 7) | (8, 7) | (9, 7) |

The processor 202, in conjunction with the AI model 212, may generate a plurality of themes based on the plurality of theme elements. For example, the plurality of theme elements may be given as ((1, 1), (1, 2), . . . , (9, 7)). A theme may be generated for each combination of the theme elements for the one or more editable features. The AI model 212 may be trained using historical data, theme data including themes applied on multiple devices and OSs previously, or from the database 210. The AI model 212 may be trained such that the AI model 212 may determine at least one of an audio score, a text score, a video score, a layout score, or an aesthetic score of the theme element, and generate a theme combining the theme elements with a maximum score. For example, considering the AI model 212 may generate a snowy theme, the AI model 212 may determine the transparency, size, color, or the like of the plurality of theme elements, based on the layout score and the aesthetic score, and may generate the theme.

The processor 202, in conjunction with the scoring module 220, may determine a score corresponding to each of the plurality of theme elements based on at least one of an audio score, a text score, a video score, a layout score, or an aesthetic score, using the AI model 212. For example, considering the first device 104 to be a smartphone and the second device 106 to be a smartwatch, the multimedia data 214 may include a snowy theme on the smartphone. The one or more theme attributes may include, but not be limited to, snowflakes, snowman, snowy mountains, icicles, snowy font, or the like. The one or more editable features may include, but not be limited to, hour needle, minute needle, second needle, watch face, Applications (apps), watch background, clock numbers, or the like. The plurality of theme elements that may be given as ((1, 1), (1, 2), . . . , (9, 7)) as shown in Table 1 may each be assigned a score as shown in Table 2. That is, each of the plurality of themes may have a corresponding cardinality score. The cardinality score may be a cumulative score of each of the theme elements corresponding to the respective theme of the plurality of themes. For example, considering theme 1 shown in Table 2, Table 2 may indicate that theme 1 is generated with a combination of ID4, ID3, ID3, ID1, ID6, ID3, ID6, ID7 and ID7 corresponding to each of the one or more editable features. In an example, the cardinality score may be a summation of the score associated with ID4, ID3, ID3, ID1, ID6, ID3, ID6, ID7 and ID7 for the respective editable feature. In an example, the scores associated with ID4, ID3, ID3, ID1, ID6, ID3, ID6, ID7 and ID7 may be (1, 0.9, 0.8, 0.8, 0.7, 0.8, 0.6, 0.6, 0.9), and thereby, the cardinality score may be 7.1. The processor 202, in conjunction with the scoring module 220, may determine a theme with a maximum cardinality score from the plurality of themes, for the second device 106.

TABLE 2

| | Editable Features/ Theme Attributes | Time | Time Separator | Watch Face Back-ground (BG) | Watch Face Element | Tray BG | Icon BG | Icons BG | List Items BG | Screen BG | Cardinality Score |
|---|---|---|---|---|---|---|---|---|---|---|---|
| ID1 | Snowy Mountain | 0 | 0.2 | 0.3 | 0.8 | 0.2 | 0.2 | 0.2 | 0 | 0.8 | |
| ID2 | Icicle | 0.4 | 0.2 | 0.1 | 0.6 | 0.1 | 0.1 | 0.1 | 0 | 0 | |
| ID3 | Snowflakes | 0.2 | 0.9 | 0.8 | 0.7 | 1 | 0.8 | 0.8 | 0 | 0.6 | |
| ID4 | Snow Fonts | 1 | 0 | 0 | 0 | 0 | 0 | 0 | 0 | 0 | |
| ID5 | Device Fonts | 1 | 0 | 0 | 0 | 0 | 0 | 0 | 0 | 0 | |
| ID6 | Clouds | 0 | 0.4 | 0.8 | 0.6 | 0.7 | 0.6 | 0.6 | 0.7 | 0.7 | |
| ID7 | Snowfall | 0 | 0.9 | 0.8 | 0.7 | 0.6 | 0.8 | 0.8 | 0.6 | 0.9 | |
| | Theme 1 | ID4 | ID3 | ID3 | ID1 | ID6 | ID3 | ID6 | ID7 | ID7 | 7.1 |
| | Theme 2 | ID5 | ID7 | ID7 | ID3 | ID7 | ID7 | ID7 | ID7 | ID7 | 7.1 |
| | Theme 3 | ID4 | ID7 | ID7 | ID7 | ID3 | ID7 | ID3 | ID7 | ID7 | 7.5 |

In an embodiment, considering the OS of the first device 104 and the second device 106 to be different, the theme generated for the second device 106 may not be applied on the second device 106 directly (e.g., the theme may require some modifications based on the differences between the operating systems). In an embodiment, the processor 202, in conjunction with the content adapter module 222, may modify the theme to adapt to the second device 106. For example, considering the first device 104 to be a smartphone including an ABC OS and the second device 106 to be a laptop including a XYZ OS, the electronic device 102 may generate a theme for the laptop based on the multimedia data 214 associated with the ABC OS. In an example, the theme may not be suitable to apply on the laptop due to difference in the OS. The content adapter module 222 may modify the theme such that the modified theme may be applied on the laptop with the XYZ OS.

In an embodiment, the memory 204 may store at least one machine executable instruction, referred to herein as at least one instruction 205. In an embodiment, the processor 202 may be embodied as an executor of software instructions. As such, the processor 202 may be capable of executing the at least one instruction 205 stored in the memory 204 to perform one or more operations described herein.

The memory 204 may be and/or may include any type of storage accessible to the processor 202 to perform respective functionalities. For example, the memory 204 may be and/or may include one or more volatile and/or non-volatile memories, or a combination thereof. For example, the memory 204 may be embodied as semiconductor memories, such as, but not limited to, flash memory, read-only memory (ROM), mask ROM, programmable ROM (PROM), erasable PROM (EPROM), random access memory (RAM), or the like. The memory 204 may store a program or at least one instruction 205 for performing operations according to the embodiments described below. The memory 204 may provide the stored data to the processor 202 in response to a request from the processor 202.

In an embodiment, the memory 204 may store information such as, but not limited to, at least one machine executable instruction, referred to herein as at least one instruction 205, AI model 212, multimedia data 214, or the like. The multimedia data 214 may include at least one of an image, an audio file, a video file, or a theme associated with the first device 104. The multimedia data 214 may be data stored over a period of time, historical theme related data, or the like. In an embodiment, the processor 202 may be embodied as an executor of software instructions. As such, the processor 202 may execute the at least one instruction 205 stored in the memory 204 to perform one or more operations described herein.

In an embodiment, the processor 202 may be configured to execute the at least one instruction 205 for obtaining the multimedia data 214 related to a theme applied on the first device 104, determining one or more theme attributes based on the multimedia data 214, using the AI model 212, obtaining one or more editable features associated with a display of the second device 106, coupled with (e.g., connected to) the first device 104, obtaining a plurality of theme elements for each combination of a theme attribute from among the one or more theme attributes and an editable feature from among the one or more editable features, obtaining a plurality of themes based on the plurality of theme elements, using the AI model 212, and determining, as the theme to be generated for the second device 106, a theme with a maximum cardinality score from among the plurality of themes. Each of the plurality of themes may have a corresponding cardinality score.

In an embodiment, the I/O module 206 may include mechanisms configured to receive inputs from and/or provide outputs to the user of the first device 104 and the second device 106. As used herein, the term user of the electronic device 102 may refer to one or more individuals, whether directly or indirectly, that are associated with managing of the first device 104 and the second device 106. In an embodiment, the output may be provided to the second device 106 on receiving multimedia data 214 from the first device 104. To enable reception of inputs and provide outputs to the electronic device 102, the I/O module 206 may include at least one input interface and at least one output interface. In an example, the operator of the electronic device 102 may configure the second device 106 via the at least one input interface. Examples of the input interface may include, but are not limited to, a keyboard, a mouse, a joystick, a keypad, a touch screen, soft keys, a microphone, or the like. Examples of the output interface may include, but are not limited to, a display such as, but not limited to, a light emitting diode display, a thin-film transistor (TFT) display, a liquid crystal display, an activematrix organic light-emitting diode (AMOLED) display, a microphone, a speaker, a ringer, a buzzer, or the like.

In an embodiment, the communication interface 208 may include mechanisms configured to communicate with other entities in the environment 100 (e.g., the first device 104 and the second device 106). In an embodiment, the communication interface 208 of the electronic device 102 may receive the multimedia data 214 from the first device 104 and/or send the theme to the second device 106.

The electronic device 102 may be in operative communication with a database 210. In an embodiment, the database 210 may be configured to store multimedia data 214.

The database 210 may include multiple storage units such as, but not limited to, hard disks and/or solid-state disks in a redundant array of inexpensive disks (RAID) configuration. In an embodiment, the database 210 may include a storage area network (SAN) and/or a network attached storage (NAS) system. In an embodiment, the database 210 may correspond to a distributed storage system, wherein individual databases may be configured to store information such as, but not limited to, multimedia data 214.

Figure 3:
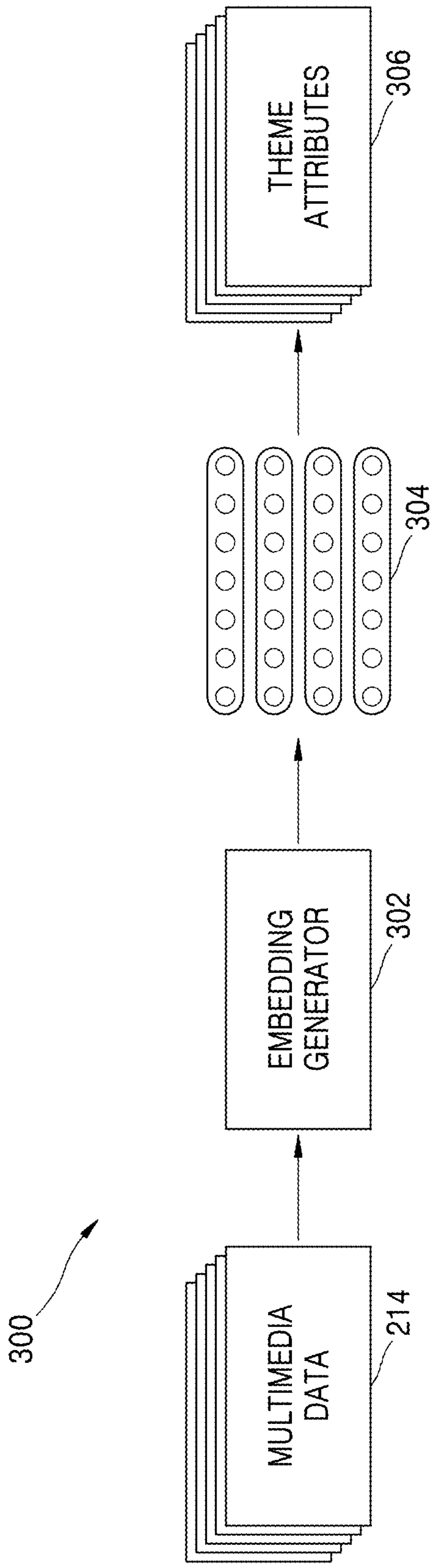
FIG. 3 illustrates an exemplary logic flow diagram for determining one or more theme attributes, in accordance with an embodiment.

FIG. 3 illustrates an exemplary logic flow diagram 300 for determining the one or more theme attributes, in accordance with an embodiment of the present disclosure. The multimedia data 214 may include at least one of an image, an audio file, a video file and a theme associated with the first device 104. The multimedia data 214 may be used to generate themes for both the first device 104 and the second device 106. The multimedia data 214 may be given as input to an embedding generator 302. The embedding generator 302 may be and/or may include a multi-modal embedding generator used for different modalities. For example, the embedding generator 302 may be based on, but not limited to, VisualBert, VideoBert, AudioClip, or the like. The embedding generator 302 may generate a relation between the multimedia data 214. The embedding generator 302 may be and/or may include a RAG model 304. In an embodiment of the present disclosure, the RAG model 304 may be used to determine the one or more theme attributes 306. For example, considering the first device 104 to be a smartphone and the second device 106 to be a smartwatch, the one or more theme attributes 306 may include, but not be limited to, snowflakes, snowman, snowy mountains, snowy font, or the like. In an embodiment, the electronic device 102 based on the RAG model 304 may determine the one or more theme attributes such as, but not limited to, a video of snowfall, icicles, audio clip of snowfall, different snowy sceneries, or the like. The electronic device 102 may determine the one or more theme attributes 306 based on the commonly associated visual features, audio features, textual data associated with snow. The electronic device 102 may generate a snowy theme for both the first device 104 and the second device 106.

Figure 4:
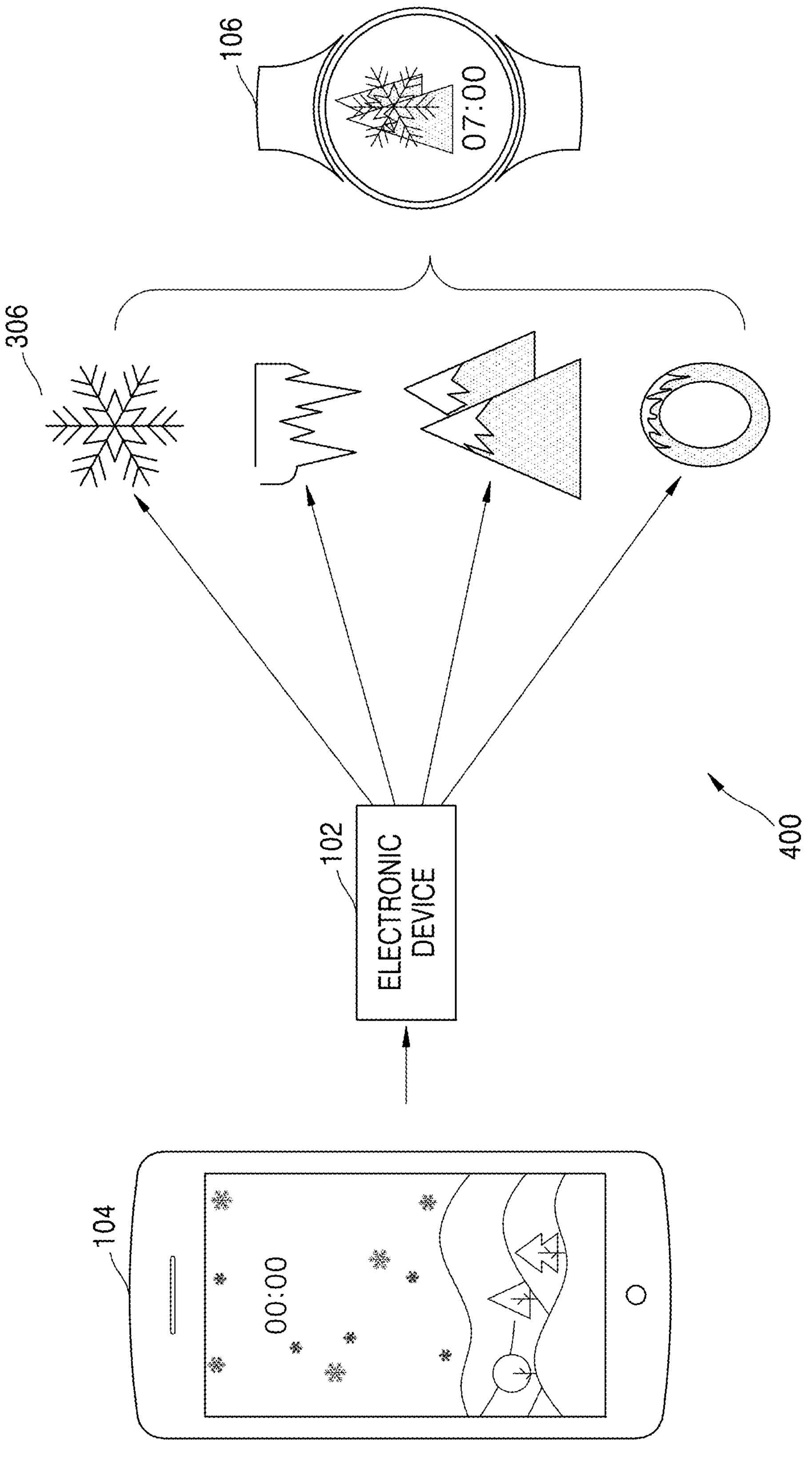
FIG. 4 depicts a technique for determining themes for coupled devices, in accordance with an embodiment.

FIG. 4 depicts, by way of an illustration 400, a process for determining themes for coupled (e.g. connected) devices, in accordance with an embodiment of the present disclosure. Referring to FIG. 4, an exemplary depiction of a process for generating theme for the second device 106 using the theme applied on the first device 104 is illustrated. For example, considering the first device 104 to be a smartphone, the second device 106 to be a smart watch, and a snowy theme is applied on the first device 104 (e.g. smartphone), a user associated with the first device 104 and the second device 106 may wish to apply a snowy theme on the second device 106 (e.g. smartwatch) as well. The electronic device 102 may obtain the multimedia data 214 (e.g., snowy theme) from the first device 104. The electronic device 102 may determine the one or more theme attributes 306 based on the snowy theme. The one or more theme attributes 306 may include, but not be limited to, snowflakes, snowy mountains, icicles, snowy fonts, or the like. The electronic device 102 may generate a theme for the second device 106 based on the one or more theme attributes 306 and the one or more editable features of the second device 106 (e.g. smartwatch) such as, but not limited to, watch face, applications, watch background, clock numbers, or the like. The present disclosure may eliminate manual generation of theme for coupled (e.g. connected) devices, thereby making the electronic device 102 robust and efficient, when compared to related devices.

Figure 5:
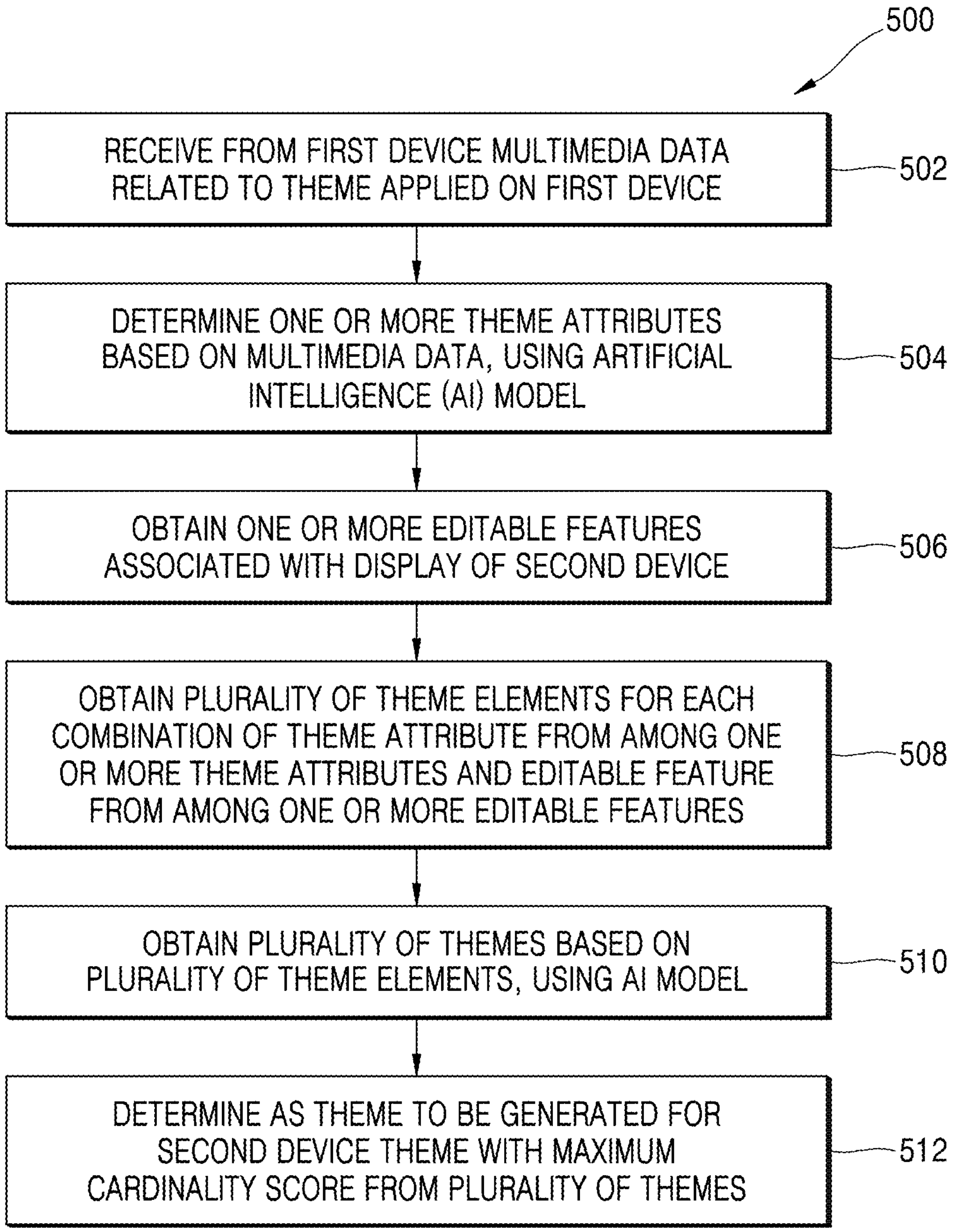
FIG. 5 illustrates a flow chart of a method of determining themes for coupled devices, in accordance with an embodiment.

FIG. 5 illustrates a flow chart of a method 500 of determining themes for coupled devices, in accordance with an embodiment of the present disclosure.

At operation 502, the method 500 may include receiving (e.g. obtaining) multimedia data 214 related to a theme applied on the first device 104, from a first device 104. The processor 202 may obtain the multimedia data 214. The multimedia data 214 may include, but is not limited to, an image, an audio file, a video file, or a theme associated with the first device 104.

At operation 504, the method 500 may include determining one or more theme attributes 306 based on the multimedia data 214, using an AI model 212. The processor 202, in conjunction with the theme extendibility module 216, may determine one or more theme attributes 306 based on the multimedia data 214 received from the first device 104. The one or more theme attributes 306 may be based on at least one of the visual features, the audio features, or the textual data present in the multimedia data 214. For example, considering the first device 104 to be a smartphone and the second device 106 to be a smartwatch, the multimedia data 214 may include, but not be limited to, a snowy theme on the first device 104 (e.g. smartphone). The one or more theme attributes 306 that may be obtained from the snowy theme may include, but not limited to, snowflakes, snowman, snowy mountains, icicles, snowy font, or the like.

At operation 506, the method 500 may include obtaining one or more editable features associated with a display of a second device 106, coupled with the first device 104. For example, considering the second device 106 to be a smartwatch, the one or more editable features obtained by the processor 202 may include, but not be limited to, the hour needle, the minute needle, the second needle, the watch face, applications, the watch background, clock numbers, or the like.

At operation 508, the method 500 may include generating a plurality of theme elements for each combination of a theme attribute from among the one or more theme attributes 306 and an editable feature from among the one or more editable features. The processor 202, in conjunction with the theme element generator module 218, may generate the plurality of theme elements.

At operation 510, the method 500 may include generating a plurality of themes based on the plurality of theme elements. The processor 202, in conjunction with the AI model 212 and the scoring module 220, may generate the plurality of themes. Each of the plurality of themes may have a corresponding cardinality score. In an embodiment, a score corresponding to each of the plurality of theme elements may be assigned, based on at least one of an audio score, a text score, a video score, a layout score, or an aesthetic score. The processor 202, in conjunction with the AI model 212, may generate the score. For the plurality of themes generated, the cardinality score may be and/or may include a cumulative score of each of the theme elements corresponding to the respective theme of the plurality of themes.

At operation 512, the method 500 may include determining a theme with a maximum cardinality score from among the plurality of themes. The processor 202, in conjunction with the scoring module 220, may determine, as the theme to be generated for the second device 106, the theme with maximum cardinality score.

The method 500, as described with reference to FIG. 5, may be implemented using software including at least one computer-executable instruction stored on one or more computer-readable media (e.g., non-transitory computer-readable media, such as, but not limited to, one or more optical media discs, volatile memory components (e.g., dynamic random-access memory (DRAM) or static random-access memory (SRAM)), or non-volatile memory or storage components (e.g., hard drives or solid-state non-volatile memory components, such as, but not limited to, flash memory components) and executed on a computer (e.g., any suitable computer, such as, but not limited to, a laptop computer, net book, Web book, tablet computing device, smart phone, or other mobile computing device). Such software may be executed, for example, on a single local computer.

The sequence of operations of the method 500 need not be necessarily executed in the same order as they are presented. Further, one or more operations may be grouped together and performed in form of a single operation, or one operation may have several sub-operations that may be performed in parallel or in sequential manner.

Figure 6:
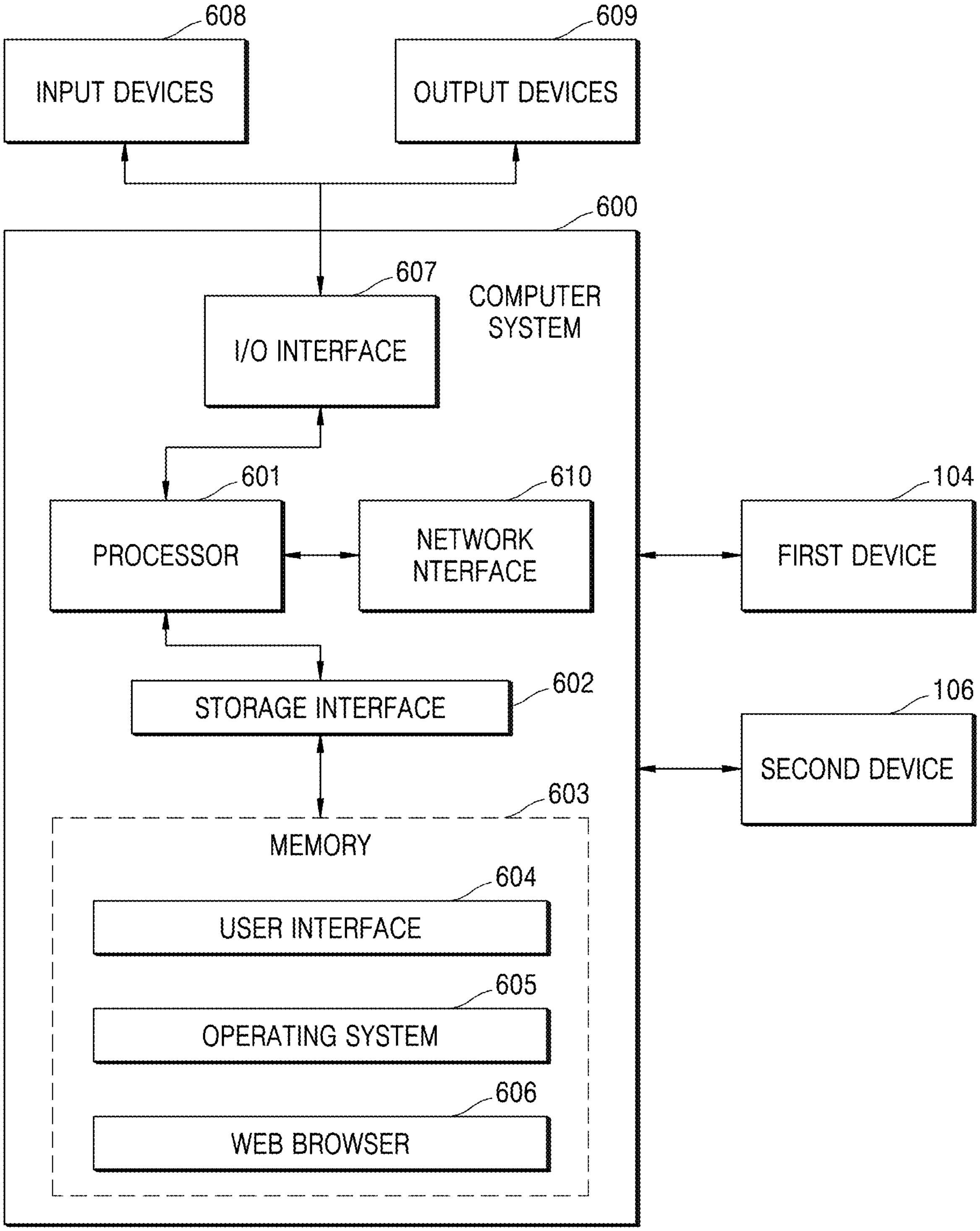
FIG. 6 illustrates a block diagram of an exemplary computer system, in accordance with an embodiment.

FIG. 6 illustrates a block diagram of an exemplary computer system 600, for implementing embodiments consistent with the present disclosure. The computer system 600 may be and/or may include, without limitation to, the electronic device 102, the first device 104, and/or the second device 106. The computer system 600 may include a processor 601 (e.g., one or more processors and/or central processing units (CPU)). The processor 601 may include at least one data processor for executing processes. The processor 601 may include specialized processing units such as, but not limited to, integrated system (bus) controllers, memory management control units, floating point units, graphics processing units, digital signal processing units, or the like.

The processor 601 may be disposed in communication with one or more input/output (I/O) devices (e.g., input devices 608 and/or output devices 609) via I/O interface 607. The I/O interface 607 may employ communication protocols/methods such as, but not limited to, audio, analog, digital, monaural, Radio Corporation of America (RCA), stereo, Institute of Electrical and Electronics Engineers (IEEE)-1394 (FireWire), serial bus, universal serial bus (USB), infrared, Personal System/2 (PS/2), Bayonet Neill-Concelman (BNC), coaxial, component, composite, digital visual interface (DVI), high-definition multimedia interface (HDMI), radio frequency (RF) antennas, separate video (S-Video), video graphics array (VGA), IEEE 802.11a/b/g/n/x (Wi-Fi), Bluetooth™, cellular (e.g., code-division multiple access (CDMA), high-speed packet access (HSPA+), global system for mobile communications (GSM), long-term evolution (LTE), WiMax, or the like), or the like.

Using the I/O interface 607, the computer system 600 may communicate with one or more I/O devices (e.g., the input devices 608 and the output devices 609). For example, the input devices 608 may be and/or may include, but not be limited to, an antenna, keyboard, mouse, joystick, (infrared) remote control, camera, card reader, fax machine, dongle, biometric reader, microphone, touch screen, touchpad, trackball, stylus, scanner, storage device, transceiver, video device/source, or the like. The output devices 609 may be and/or may include, but not be limited to, a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, or the like. In an embodiment, the I/O interface 607 may be connected to the electronic device 102 to receive multimedia data 214 from the first device 104 and generate a theme for both the first device 104 and the second device 106.

In an embodiment, the processor 601 may be disposed in communication with external elements such as, but not limited to, external computer systems, servers, network elements. The network interface 610 may employ connection protocols including, but not limited to, direct connect, Ethernet (e.g., twisted pair 10/100/1000 Base T), transmission control protocol/internet protocol (TCP/IP), token ring, WiFi, or the like.

In an embodiment, the processor 601 may be disposed in communication with a memory 603 (e.g., RAM, ROM, or the like) via a storage interface 602. The storage interface 602 may connect to memory 603 including, but not limited to, memory drives, removable disc drives, or the like, employing connection protocols such as, but not limited to, serial advanced technology attachment (SATA), integrated drive electronics (IDE), IEEE-1394, Universal Serial Bus (USB), fibre channel (FC), small computer systems interface (SCSI), or the like. The memory drives may further include a drum, magnetic disc drive, magneto-optical drive, optical drive, redundant array of independent discs (RAID), solid-state memory devices, solid-state drives, or the like.

The memory 603 may store a collection of program or database components, including, but not limited to, user interface 604, an operating system 605, a web browser 606, or the like. In an embodiment, computer system 600 may store user/application data, such as, but not limited to, the data, variables, records, or the like. The databases may be implemented as fault-tolerant, relational, scalable, secure databases such as, but not limited to, Oracle® or Sybase®.

The operating system 605 may facilitate resource management and operation of the computer system 600. Examples of operating systems may include, but are not limited to, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, or the like), LINUX DISTRIBUTIONS™ (e.g., RED HAT™, UBUNTU™, KUBUNTU™, or the like), IBM™ OS/2, MICROSOFT™ WINDOWS™ (e.g., XP™, VISTA™/7/8, 10, or the like), APPLE® IOS™, GOOGLER ANDROID™, BLACKBERRY® OS, or the like.

In an embodiment, the computer system 600 may implement the web browser 606 stored program components. The web browser 606 may be and/or may include a hypertext viewing application, such as, but not limited to, MICROSOFT® INTERNET EXPLORER®, GOOGLE™ CHROME™, MOZILLA® FIREFOX®, APPLE® SAFARI®, or the like. Secure web browsing may be provided using secure hypertext transport protocol (HTTPS), secure sockets layer (SSL), transport layer security (TLS), or the like. The web browser 606 may utilize facilities such as, but not limited to, AJAX, DHTML, ADOBE® FLASH®, JAVASCRIPT®, JAVA®, Application Programming Interfaces (APIs), or the like. In an embodiment, the computer system 600 may implement a mail server stored program component. The mail server may be an Internet mail server such as, but not limited to, Microsoft Exchange, or the like. The mail server may utilize facilities such as, but not limited to, active server pages (ASP), ACTIVEX®, ANSI® C++/C #, MICROSOFT®, .NET, common gateway interface (CGI) SCRIPTS, JAVA®, JAVASCRIPT®, PERL®, hypertext preprocessor (PHP), PYTHON®, WEBOBJECTS®, or the like. The mail server may utilize communication protocols such as, but not limited to, internet message access protocol (IMAP), messaging application programming interface (MAPI), MICROSOFT® exchange, post office protocol (POP), simple mail transfer protocol (SMTP), or the like. In an embodiment, the computer system 600 may implement a mail client stored program component. The mail client may be a mail viewing application, such as, but not limited to, APPLE® MAIL, MICROSOFT® ENTOURAGE®, MICROSOFT® OUTLOOK®, MOZILLA® THUNDERBIRD®, or the like.

The present disclosure may provide a method and an electronic device for generating a theme for coupled (e.g. connected) devices. The present disclosure may receive multimedia data from a first device and may generate similar themes for both the first device and the second device associated with the same user. The present disclosure may generate the theme automatically and may reduce the time taken to customize themes. Further, the themes may be adaptable to different operating systems making it easier to apply to multiple devices regardless of the operating system. An electronic device according to the present disclosure may be robust and efficient as it may eliminate the manual efforts and time taken for generating themes for coupled devices.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor may be at least one of a microprocessor and a processor capable of processing and executing the queries. A non-transitory computer readable medium may include media such as, but not limited to, magnetic storage medium (e.g., hard disk drives, floppy disks, tape, or the like), optical storage (e.g., compact disk ROMs (CD-ROMs), digital versatile disks (DVDs), optical disks, or the like), volatile and non-volatile memory devices (e.g., electrical erasable PROMs (EEPROMs), ROMs, PROMs, RAMS, DRAMs, SRAMs, flash memory, firmware, or programmable logic), or the like. Further, non-transitory computer-readable media may include all computer-readable media except for a transitory. The code implementing the described operations may further be implemented in hardware logic (e.g., an integrated circuit chip, programmable gate array (PGA), application specific integrated circuit (ASIC), or the like).

The illustrated operations are set out to describe the exemplary embodiments shown, and it should be anticipated that ongoing technological development may change the manner in which particular functions are performed. These examples are presented herein for illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, or the like, of those described herein) may be apparent to persons skilled in the relevant art based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein, the singular forms "a," "an," and "the" include plural references unless the context clearly dictates otherwise.

Furthermore, one or more computer-readable storage medium may be utilized in implementing embodiments consistent with the present disclosure. A computer readable storage medium refers to any type of physical memory on which information or data readable by a processor may be stored. Thus, a computer readable storage medium may store instructions for execution by one or more processors, including instructions for causing the processors to perform operations or stages consistent with the embodiments described herein. The term "computer readable medium" should be understood to include tangible items and exclude carrier waves and transient signals (e.g., are non-transitory). Examples may include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

According to an embodiment of the present disclosure, a method performed by an electronic device may be provided. The method may include receiving, from a first device, multimedia data related to a theme applied on the first device. The method may include determining, using an artificial intelligence (AI) model, one or more theme attributes based on the multimedia data. The method may include obtaining one or more editable features associated with a display of a second device. The method may include obtaining a plurality of theme elements for each combination of a theme attribute from among the one or more theme attributes and an editable feature from among the one or more editable features. The method may include obtaining a plurality of themes based on the plurality theme elements, using the AI model. The method may include determining, as the theme to be generated for the second device, a theme with a maximum cardinality score from among the plurality of themes. The second device may be coupled with the first device. Each theme of the plurality of themes may comprise a corresponding cardinality score.

According to an embodiment of the present disclosure, the generating of the plurality of theme elements may comprise determining, using the AI model, a score corresponding to each theme element of the plurality of theme elements, based on at least one of an audio score, a text score, a video score, a layout score, or an aesthetic score.

According to an embodiment of the present disclosure, the corresponding cardinality score may comprise a cumulative score of each theme element of the plurality of theme elements of a corresponding theme of the plurality of themes.

According to an embodiment of the present disclosure, the method may comprise applying, to the second device, the theme with the maximum cardinality score.

According to an embodiment of the present disclosure, the multimedia data may comprise at least one of an image, an audio file, a video file, or a theme associated with the first device.

According to an embodiment of the present disclosure, the one or more theme attributes may be associated with at least one of visual features, audio features, or textual data present in the multimedia data.

According to an embodiment of the present disclosure, the first device and the second device may be associated with a same user.

According to an embodiment of the present disclosure, an electronic device may be provided. The electronic device may comprise one or more processors comprising processing circuitry, and memory storing at least one instruction. The at least one instruction, when executed by the one or more processors individually or collectively, may cause the electronic device to receive, from a first device, multimedia data related to a theme applied on the first device. The at least one instruction, when executed by the one or more processors individually or collectively, may cause the electronic device to determine, using an AI model, one or more theme attributes based on the multimedia data. The at least one instruction, when executed by the one or more processors individually or collectively, may cause the electronic device to obtain one or more editable features associated with a display of a second device. The at least one instruction, when executed by the one or more processors individually or collectively, may cause the electronic device to obtain a plurality of theme elements for each combination of a theme attribute from among the one or more theme attributes and an editable feature from among the one or more editable features. The at least one instruction, when executed by the one or more processors individually or collectively, may cause the electronic device to obtain a plurality of themes based on the plurality of theme elements, using the AI model. The at least one instruction, when executed by the one or more processors individually or collectively, may cause the electronic device to determine, as the theme to be generated for the second device, a theme with a maximum cardinality score from among the plurality of themes. The second device may be coupled with the first device. Each theme of the plurality of themes may comprise a corresponding cardinality score.

According to an embodiment of the present disclosure, the at least one instruction, when executed by the one or more processors individually or collectively, may cause the electronic device to determine, using the AI model, a score corresponding to each theme element of the plurality of theme elements, based on at least one of an audio score, a text score, a video score, a layout score, or an aesthetic score.

According to an embodiment of the present disclosure, the at least one instruction, when executed by the one or more processors individually or collectively, may cause the electronic device to apply, to the second device, the theme with the maximum cardinality score.

According to an embodiment of the present disclosure, a non-transitory computer-readable storage medium may store at least one computer-executable instruction. The at least one computer-executable instruction, when executed by at least one processor of an electronic device individually or collectively, may cause the electronic device to perform the method.

According to an embodiment of the present disclosure, the at least one computer-executable instruction, when executed by at least one processor of an electronic device individually or collectively, may cause the electronic device to receive, from a first device, multimedia data related to a theme applied on the first device. The at least one computer-executable instruction, when executed by at least one processor of an electronic device individually or collectively, may cause the electronic device to determine, using an AI model, one or more theme attributes based on the multimedia data. The at least one computer-executable instruction, when executed by at least one processor of an electronic device individually or collectively, may cause the electronic device to obtain one or more editable features associated with a display of a second device. The at least one computer-executable instruction, when executed by at least one processor of an electronic device individually or collectively, may cause the electronic device to obtain a plurality of theme elements for each combination of a theme attribute from among the one or more theme attributes and an editable feature from among the one or more editable features. The at least one computer-executable instruction, when executed by at least one processor of an electronic device individually or collectively, may cause the electronic device to obtain a plurality of themes based on the plurality of theme elements, using the AI model. The at least one computer-executable instruction, when executed by at least one processor of an electronic device individually or collectively, may cause the electronic device to determine, as the theme to be generated for the second device, a theme with a maximum cardinality score from among the plurality of themes. The second device may be coupled with the first device. Each theme of the plurality of themes may comprise a corresponding cardinality score.

According to an embodiment of the present disclosure, the at least one computer-executable instruction, when executed by at least one processor of an electronic device individually or collectively, may cause the electronic device to determine, using the AI model, a score corresponding to each theme element of the plurality of theme elements, based on at least one of an audio score, a text score, a video score, a layout score, or an aesthetic score.

According to an embodiment of the present disclosure, the at least one computer-executable instruction, when executed by at least one processor of an electronic device individually or collectively, may cause the electronic device to apply, to the second device, the theme with the maximum cardinality score.

What is claimed is:

1. A method performed by an electronic device comprising:

receiving, from a first device, multimedia data related to a theme applied on the first device;

determining, using an artificial intelligence (AI) model, one or more theme attributes based on the multimedia data;

obtaining one or more editable features associated with a display of a second device, the second device being coupled with the first device;

obtaining a plurality of theme elements for each combination of a theme attribute from among the one or more theme attributes and an editable feature from among the one or more editable features;

obtaining a plurality of themes based on the plurality of theme elements, using the AI model, each theme of the plurality of themes comprising a corresponding cardinality score; and determining, as the theme to be generated for the second device, a theme with a maximum cardinality score from among the plurality of themes.

2. The method of claim 1, wherein the generating of the plurality of theme elements comprises:

determining, using the AI model, a score corresponding to each theme element of the plurality of theme elements, based on at least one of an audio score, a text score, a video score, a layout score, or an aesthetic score.

3. The method of claim 1, wherein the corresponding cardinality score comprises a cumulative score of each theme element of the plurality of theme elements of a corresponding theme of the plurality of themes.

4. The method of claim 1, further comprising:

applying, to the second device, the theme with the maximum cardinality score.

5. The method of claim 1, wherein the multimedia data comprises at least one of an image, an audio file, a video file, or a theme associated with the first device.

6. The method of claim 1, wherein the one or more theme attributes are associated with at least one of visual features, audio features, or textual data present in the multimedia data.

7. The method of claim 1, wherein the first device and the second device are associated with a same user.

8. An electronic device comprises:

one or more processors comprising processing circuitry; and memory storing at least one instruction, wherein the at least one instruction, when executed by the one or more processors individually or collectively, cause the electronic device to:

receive, from a first device, multimedia data related to a theme applied on the first device;

determine, using an artificial intelligence (AI) model, one or more theme attributes based on the multimedia data;

obtain one or more editable features associated with a display of a second device, the second device being coupled with the first device;

obtain a plurality of theme elements for each combination of a theme attribute from among the one or more theme attributes and an editable feature from among the one or more editable features;

obtain a plurality of themes based on the plurality of theme elements, using the AI model, each theme of the plurality of themes comprising a corresponding cardinality score; and determine, as the theme to be generated for the second device, a theme with a maximum cardinality score from among the plurality of themes.

9. The electronic device of claim 8, wherein the at least one instruction, when executed by the one or more processors individually or collectively, further cause the electronic device to:

determine, using the AI model, a score corresponding to each theme element of the plurality of theme elements, based on at least one of an audio score, a text score, a video score, a layout score, or an aesthetic score.

10. The electronic device of claim 8, wherein the corresponding cardinality score comprises a cumulative score of each theme element of the plurality of theme elements of a corresponding theme of the plurality of themes.

11. The electronic device of claim 8, wherein the at least one instruction, when executed by the one or more processors individually or collectively, further cause the electronic device to:

apply, to the second device, the theme with the maximum cardinality score.

12. The electronic device of claim 8, wherein the multimedia data comprises at least one of an image, an audio file, a video file, or a theme associated with the first device.

13. The electronic device of claim 8, wherein the one or more theme attributes are associated with at least one of visual features, audio features, or textual data present in the multimedia data.

14. The electronic device of claim 8, wherein the first device and the second device are associated with a same user.

15. A non-transitory computer-readable storage medium storing at least one computer-executable instruction, when executed by at least one processor of an electronic device individually or collectively, cause the electronic device to:

receive, from a first device, multimedia data related to a theme applied on the first device;

determine, using an artificial intelligence (AI) model, one or more theme attributes based on the multimedia data;

obtain one or more editable features associated with a display of a second device, the second device being coupled with the first device;

obtain a plurality of theme elements for each combination of a theme attribute from among the one or more theme attributes and an editable feature from among the one or more editable features;

obtain a plurality of themes based on the plurality of theme elements, using the AI model, each theme of the plurality of themes comprising a corresponding cardinality score; and determine as the theme to be generated for the second device, a theme with a maximum cardinality score from among the plurality of themes.

16. The non-transitory computer-readable storage medium of claim 15, wherein the at least one computer-executable instruction, when executed by the at least one processor individually or collectively, further cause the electronic device to:

determine, using the AI model, a score corresponding to each theme element of the plurality of theme elements, based on at least one of an audio score, a text score, a video score, a layout score, or an aesthetic score.

17. The non-transitory computer-readable storage medium of claim 15, wherein the corresponding cardinality score comprises a cumulative score of each theme element of the plurality of theme elements of a corresponding theme of the plurality of themes.

18. The non-transitory computer-readable storage medium of claim 15, wherein the at least one computer-executable instruction, when executed by the at least one processor individually or collectively, further cause the electronic device to:

apply, to the second device, the theme with the maximum cardinality score.

19. The non-transitory computer-readable storage medium of claim 15, wherein the multimedia data comprises at least one of an image, an audio file, a video file, or a theme associated with the first device.

20. The non-transitory computer-readable storage medium of claim 15, wherein the one or more theme attributes are associated with at least one of visual features, audio features, or textual data present in the multimedia data.

* * * * *